H. F. HITNER.
APPARATUS FOR SPLITTING GLASS CYLINDERS.
APPLICATION FILED MAR. 28, 1912.

1,131,134.

Patented Mar. 9, 1915.

WITNESSES:
Julian H. Kendig.
Harvey L. Lechner.

INVENTOR.
Harry F. Hitner
BY Paul Synnestvedt
ATTORNEY.

UNITED STATES PATENT OFFICE.

HARRY F. HITNER, OF MOUNT VERNON, OHIO, ASSIGNOR TO THE PITTSBURGH PLATE GLASS COMPANY, OF PITTSBURGH, PENNSYLVANIA, A CORPORATION OF PENNSYLVANIA.

APPARATUS FOR SPLITTING GLASS CYLINDERS.

1,131,134.  Specification of Letters Patent.  Patented Mar. 9, 1915.

Application filed March 28, 1912. Serial No. 686,934.

*To all whom it may concern:*

Be it known that I, HARRY F. HITNER, a citizen of the United States, residing at Mount Vernon, in the county of Knox and State of Ohio, have invented certain new and useful Improvements in Apparatus for Splitting Glass Cylinders, of which the following is a specification.

Figure 1:
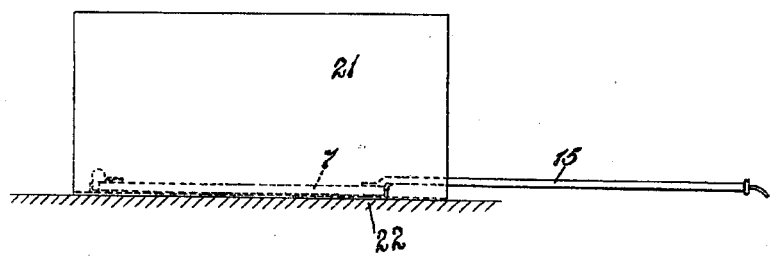
Figure 2:
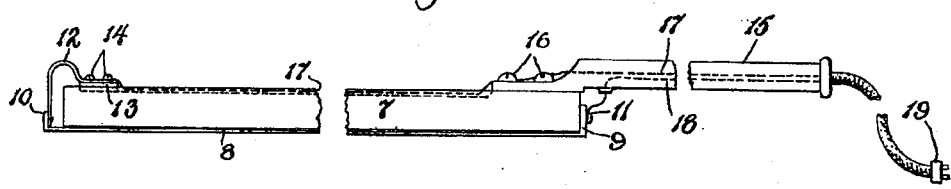
Figure 3:
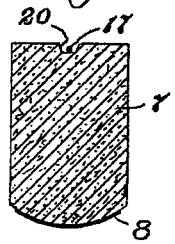
Figure 4:
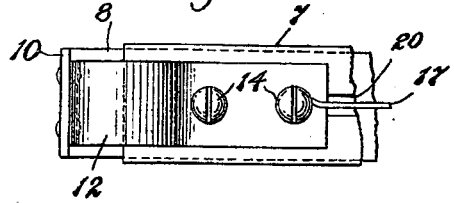

The invention relates to an apparatus for splitting glass cylinders, and it has for its primary object the provision of an improved electrically heated member for splitting glass cylinders which is simple in construction and may be conveniently and economically operated. This, together with such other objects as may hereinafter appear, or may be incidental to my invention, I attain by means of a construction which I have illustrated in preferred form in the accompanying drawings wherein Figure 1 is a diagrammatic illustration of a section of a glass cylinder which is to be split, showing the operation of my improved electrically heated splitting member. Figure 2 is a side elevation of the splitting member; Figure 3 is a cross section through the splitting member drawn on an enlarged scale; and Figure 4 is a plan view of a detail of my invention likewise drawn on a large scale to more closely illustrate the parts.

Heretofore in splitting glass cylinders, it has been customary to lay the sections of cylinders on a table or other suitable support having a flat surface and then to reciprocate an iron splitting member which is heated to red hot condition back and forth along the inner surface of the cylinder adjacent the table. This method of splitting cylinders is objectionable because of the difficulty of heating the iron to the proper degree of heat; and because the iron loses its heat as successive cylinders are split. The heat of the iron is thus irregular and the iron is frequently either too hot or too cold, which results in breakage of the glass. The time lost in carrying back and forth the heated iron and also the expense involved for fuel for heating purposes and the rapid deterioration of the iron incident to the successive heatings increases the cost of production considerably. My invention contemplates the provision of a splitting member which will have a uniform degree of heat at all times, which will not be subject to rapid deterioration and which will be economical in operation. In carrying out my invention, I employ an electrically heated splitting member comprising a supporting strip or block 7 preferably composed of asbestos wood or a similar non-conducting substance, the lower edge of which is rounded to conform to the shape of the strip 8 which is preferably composed of a non-oxidizing resistance alloy, such for example as nickel chromium. The resistance strip 8 is provided at each end with upturned portions 9 and 10, and is supported on the block 7 by means of the stud 11 which secures the upturned portion 9 to the rear end of the block and by the spring 12 which is riveted to the upturned portion 10 and is secured to the plate 13 by means of the screws 14, said screws serving to secure the spring and plate to the front end of the block 7. A hollow handle 15 is fastened to the block 7 by means of the screws 16 and is adapted to receive the wires 17 and 18 which may be connected to any suitable source of electric current by means of the plug 19. The wire 18 leads to the upturned portion 9 of the strip 8, which constitutes one terminal, and the wire 17 leads to the spring 12, which constitutes the other terminal of the strip 8. The wire 17 normally lies in the groove 20 formed in the upper edge of the block 7. The operation of the device is as follows; assuming that the plug 19 has been inserted in a suitable socket.

The current passing through the wires 17 and 18 and resistance strip 12 heats the resistance strip and when sufficient heat is generated, the implement is placed within a section of a cylinder 21 as indicated in Fig. 1, and is reciprocated longitudinally on the inner surface of the cylinder adjacent the supporting table or platform, as diagrammatically indicated at 22. The heat splits the cylinder lengthwise, after which the cylinder is turned through 180° and the operation is repeated, the cylinder being thus divided into two parts.

The resistance strip 8 is rounded in cross section and is of substantially the same width as the block 7, this form having been found most suitable to secure sufficient rigidity to prevent warping or other distortion of the heating strip. This is of importance as the strip 8 should be in substantial contact throughout its length with the glass to secure the most effective operation. As the co-efficient of expansion and retraction of the resistance strip is greater than that of the supporting block 7, I have found it desirable to fasten the resistance strip rigidly to but one end of the block 7, the other end being held yieldingly by the spring 12, which is, however, of a stiffness sufficient to properly support the strip on the block 7.

It will be apparent from the foregoing that the heat of the resistance strip will be uniform and continuous and that the device is not only effective but also economical in operation. The supporting block 7 is preferably composed of asbestos wood or similar substance which is a non-conductor of electricity and heat and is advantageous in that the heat of the resistance strip is not absorbed and simplicity of insulation is obtained. The parts of the device are inexpensive and are easily assembled and repaired. It is further to be observed that the length of the heating member is less than that of the section of the cylinder being split, in order that a small portion of the glass at each end of the cylinder will not be brought up to heat until the central portion has been heated. This has been found to prevent breakage which occurs if the end portions of the cylinder are heated sooner than the central portion, and in many cases if the end portions and central portions are simultaneously heated.

Having thus described my invention and illustrated its use, what I claim as new and desire to secure by Letters Patent is the following:

1. A glass splitting device comprising a relatively rigid bar having one edge straight, a relatively thin band of metal extending along and supported flatwise by the said edge, and means for sending a current of electricity through the strip of metal to heat it.

2. A glass splitting device comprising a relatively rigid bar of non-conducting material having one edge straight, a strip of metal of concave convex cross-section extending along and supported by the said edge with the concave surface inward, and means for sending a current of electricity through the strip of metal to heat it.

3. A glass splitting device comprising a relatively rigid bar of non-conducting material having one edge straight, a strip of metal of concave convex cross-section extending along and supported by the said edge with the concave surface inward and means for sending a current of electricity through the strip of metal to heat it, the edge of the bar in contact with the strip being convex to fit the concave surface of the bar.

In testimony whereof I have hereunto signed my name in the presence of the two subscribed witnesses.

HARRY F. HITNER.

Witnesses:
H. W. HANCOCK,
BARMER M. ALLEN.